May 14, 1968     F. DE BUIGNE     3,382,653
POWER DRIVEN ROTARY MOWER
Filed Oct. 16, 1964     3 Sheets-Sheet 1
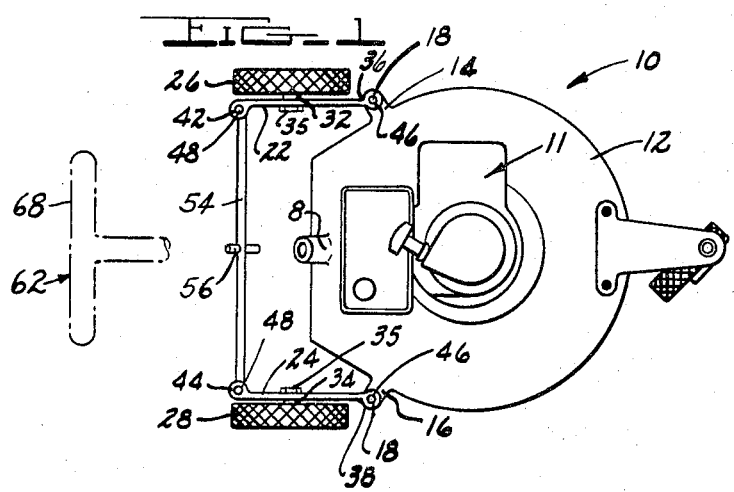
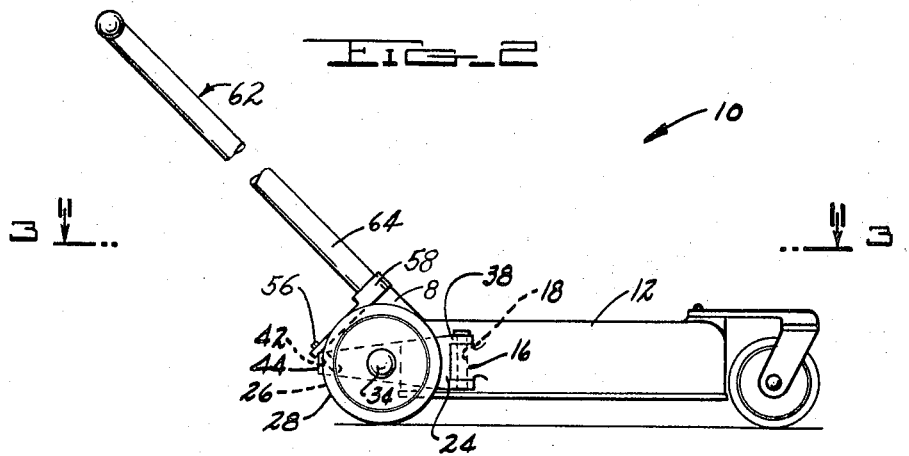
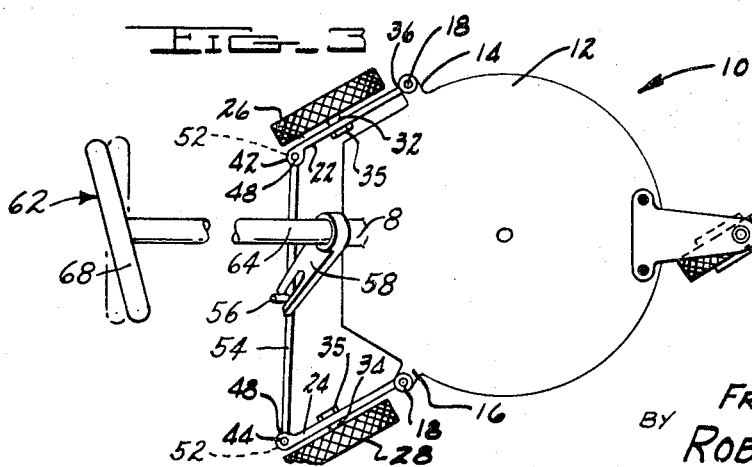
INVENTOR
FRANK DE BUIGNE
BY ROBERT H. ELLIOTT

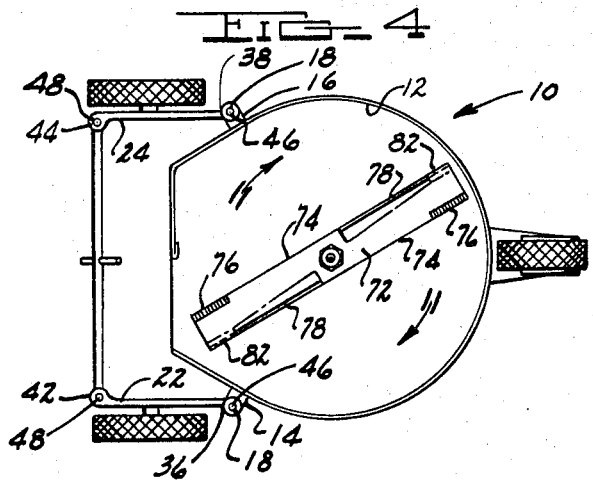
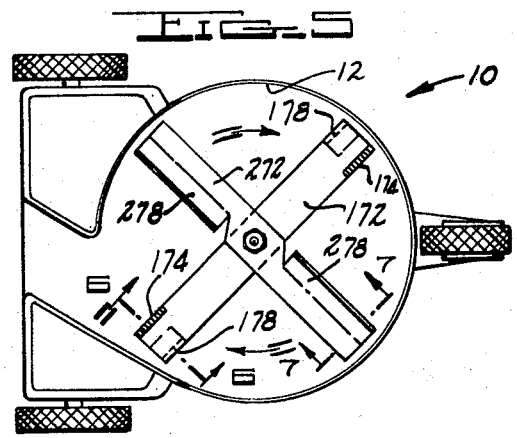
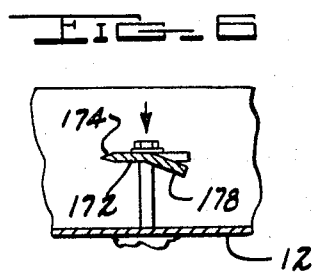
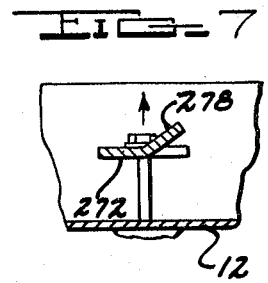
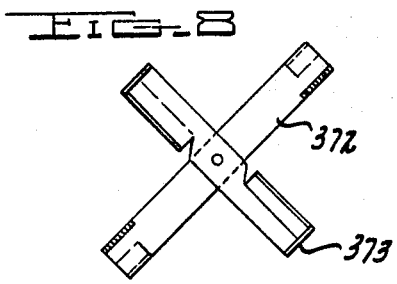
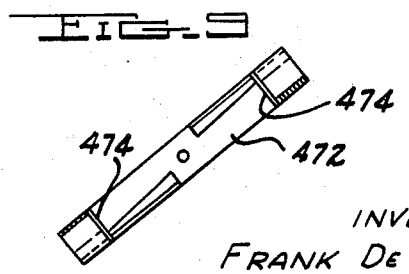
INVENTOR
FRANK DE BUIGNE May 14, 1968   F. DE BUIGNE   3,382,653
POWER DRIVEN ROTARY MOWER
Filed Oct. 16, 1964   3 Sheets-Sheet 3

INVENTOR
FRANK DE BUIGNE

United States Patent Office 3,382,653
Patented May 14, 1968

3,382,653
POWER DRIVEN ROTARY MOWER
Frank De Buigne, 1420 Suffield,
Birmingham, Mich. 48009
Filed Oct. 16, 1964, Ser. No. 404,304
1 Claim. (Cl. 56—25.4)

The present invention relates to new and useful improvements in lawn mowers and particularly to a power driven rotary mower which has a pivotal handle for steering said mower, while the cutter blade is designed in such a manner as to reduce the rolling resistance to the ground when said mower is operated.

It is therefore a primary object of the present invention to provide a power driven rotary lawn mower which will be easier to operate and which can be directed over a pre-selected path.

Another object of the invention is the provision of a power driven rotary lawn mower assembly which permits the use of existing components with only slight modification.

Still another object of the present invention is the provision of a power mower which is not only more efficient, but one which can be manufactured at approximately the same cost as those mowers currently being manufactured.

The above and other objects of the present invention can be accomplished by the provision of a power driven rotary lawn mower assembly which has, a housing, at least one generally flat blade in said housing, driving means supported by said housing for rotating said blade, the leading edge adjacent the point of rotation having a cutting surface thereon while the trailing edge thereof is deformed to form a blower, a pivotal handle on said housing, a plurality of wheels secured to said housing, certain of said wheels being pivotal, a pivotal link interposed intermediate said pivotal handle and said pivotal wheels, displacement of said pivotal handle causes said pivotal link to displace said pivotal wheels, while the rotation of said generally flat blade creates an air pressure which lifts the housing and parts secured thereto to reduce the rolling resistance of the complete mower assembly.

Other objects of this invention will appear in the following description and appended claim, reference being had to the accompanying drawings forming a part of this specification wherein like reference characters designate corresponding parts in the several views.

In the drawings:

FIGURE 1 is a plan view of a power driven rotary lawn mower which embodies the present invention.

FIGURE 2 is an elevational view of the mower assembly shown in FIGURE 1, with the handle shown in position and the power driving means omitted.

FIGURE 3 is a view taken substantially along lines 3—3 of FIGURE 2, to illustrate the steering mechanism.

FIGURE 4 is a bottom view of the underside of mower shown in FIGURE 1.

FIGURE 5 is a bottom view of a modified form of the present invention, wherein only one wheel is pivotal.

FIGURE 6 is a sectional view taken along lines 6—6 of FIGURE 5.

FIGURE 7 is a sectional view taken along lines 7—7 of FIGURE 5.

FIGURE 8 is another modified form of the present invention.

FIGURE 9 is still another modified form of the present invention.

Figure 4A:
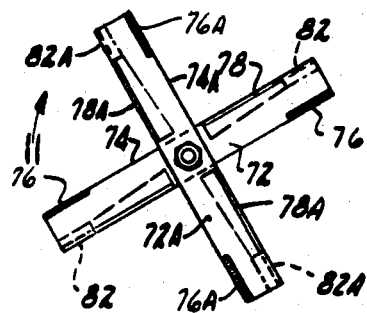
FIGURE 4A is a modified form of the present invention similar to FIGURE 4, wherein two blades are used.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not limitation.

In the drawings, FIGURE 1 illustrates a plan view of a power driven rotary lawn mower 10, which assembly embodies the present invention. The mower housing assembly 12 is of the same general configuration as any commercially manufactured unit which is currently available, with one exception. The exception being two extensions 14 and 16 which depend outwardly from the mower housing 12 proper. Each of the extensions 14 and 16 have a round opening 18 which is perpendicular to the top of the mower housing 12 and extends through said extensions.

Two generally flat pivotal members 22 and 24 have wheels 26 and 28 rotatably secured thereto. Each of said wheels 26 and 28 are mounted on axles 32 and 34 which are integral with the pivotal members 22 and 24, or are secured to said pivotal members by any suitable means. As illustrated, the axles 32 and 34 are secured to said flat pivotal members 22 and 24 with a nut 35.

The front portions 36 and 38 of each of the pivotal members 22 and 24 are enlarged, as are the rear portions 42 and 44. Each of the enlarged portions 36, 38, 42 and 44 have the central portions thereof cut away to form a forked structure. At right angles to the central cut away portions are located two round openings 46 and 48, in each of the pivotal members 22 and 24. Opening 46 is located in the enlarged portions 36 and 38 of the pivotal members, while opening 48 is located in the enlarged end portions 42 and 44. Each of said openings 46 and 48 are located in generally parallel relationship to each other, as well as the upper and lower surfaces of the pivotal members 22 and 24. The enlarged portions 36 and 38 of the pivotal members are positioned about the extensions 14 and 16. This is accomplished with a pin which extends through the openings 18 and 46 respectively, and which are in alignment. A similar type pin extends through opening 48 and the aligned openings 52 in the pivotal link 54 which is between the pivotal members 22 and 24.

Centrally positioned between the ends of the pivotal link 54 is a pin 56, which is cooperable with a forked member 58 that is rigidly secured to the rotational handle member 62. The inner end of the handle 62 is identified by the numeral 64 and is rotatably secured to the mower housing 12. The cylindrical end of the handle 62 is located in the hollow socket 8 which is integral with the mower housing 12. The handle 62 may be secured within the opening in the socket by any suitable means, such as a washer and cotter key or snap ring etc., or it may be secured by deforming the end of the handle to render same a fixed part of the mower assembly 10.

The outer end of the handle 62 is identified by the numeral 68 and is of generally T shaped configuration. Therefore, when the T-shaped handle grip is rotated within the socket 8, the forked member 58 engages the pin 56 in the pivotal link 54 to displace the wheels and cause the complete assembly to travel in a direction other than straight ahead, which in turn will permit the operator of the mower asembly to cut grass or the like beneath trees, bushes and shrubs without having any bodily contact therewith. This of course is not possible to accomplish with any mower which is currently available in the marketplace.

In addition to the above, we note in FIGURE 4 that the mower assembly of the present invention is inverted and has a cutter bar 72 which is rotationally secured to the power source such as a gasoline engine 11 as shown in FIGURE 1. The leading edge of the cutter bar 72 is identified by the numeral 74 and the sharpened portion on each end thereof is identified by the numeral 76. The trailing edge of the cutter bar 72 is deformed downwardly away from the mower housing at 78 to form a suction device, while the outer end of the trailing edge is deformed upwardly toward the housing 12 at 82. Rotation of the cutter bar during usage will produce two results. First, when the cutter bar 72 is rotated, a suction will be created by the action of the deformed portion 82, to stand the grass up for cutting, while the deformed portion 78 will create an air pressure beneath the mower housing which will lift the mower assembly so that wheel load and the forward movement of the complete assembly will be substantially reduced.

In the modified inverted form of the invention shown in FIGURE 5, a double bar is used. The first bar 172 is the cutter bar and has a sharpened portion on the leading edge of each end thereof identified by numeral 174. The trailing edge of the cutter bar 172 is deformed toward the housing 12 at 178 as described in connection with the cutter blade in FIGURE 4. The second bar 272 is disposed at substantially right angles to cutter bar 172 and the trailing edge thereof 278 is deformed away from the housing 12 to form a blower when said bars are rotated. The operation thereof will be substantially the same as that of the single blade device. The deformed portion 178 of the blade when rotated creates a suction to stand the grass to be cut, while the deformed portion 278 creates a pressure to reduce the wheel load and consequently the energy required to move the wheeled mower assembly over the lawn while cutting same.

In the drawing shown in FIGURE 5, only the forward wheel of the mower assembly is pivotal, while the rear wheels are fixed on a rigid axle, secured to the mower frame. The cutting height of the mower blade can be adjustable when removable axles are used, since it merely requires the removal of the respective axles and the replacement thereof in another opening which is provided for this purpose.

The configuration of the respective bars 172 and 272 are shown in FIGURES 6 and 7 respectively, while modified forms 372 and 472 are shown in FIGURES 8 and 9. The modified form shown in FIGURE 8 illustrates a double blade which is generally flat wherein the cutter blade has two cuttings edges and is longer than the bar which is deformed away from the housing 12 to form the blower, however, the ends of the blower bar each have a baffle 373 secured at right angles thereto. In the single cutter bar 472 shown in FIGURE 9, the baffle portion 474 is generally the same as previously provided but located intermediate the ends thereof.

It will be noted in FIGURE 4A that a second blade or cutter bar 72A has been illustrated. This is of the same general configuration as cutter bar 72 and each of the identification characters has a suffix "A" thereon, thus eliminating the need for further description of the blade.

Figure 9A:
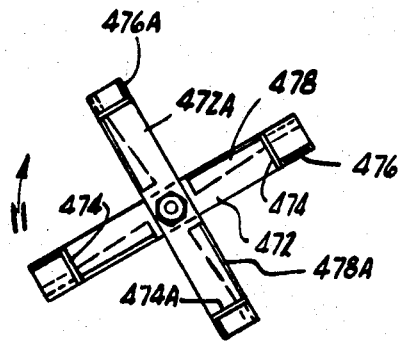
FIGURE 9A is a modified form of the present invention similar to FIGURE 9, wherein two blades are used.

The same may be said for FIGURE 9A, with the exception that the cutter bar 472A is of different length than cutter bar 472. Otherwise the structure is the same. The baffle portion 474 and 474A are merely pieces of generally rectangular material which are secured to the cutter bars 472 and 472A for the purpose of air flow control within the housing when the cutter bars are rotated at high speed. They are secured by welding, brazing, screws, rivets or the like.

Having thus described my invention.

I claim:

1. In a power driven rotary lawn mower, the combination of:
   a wheeled housing;
   a substantially flat grass cutter blade within said housing,
   driving means on said housing for rotating said cutter blade; one edge of said blade having a cutting edge thereon while the other edge has a portion adjacent the end deformed toward the housing to create a suction to stand up the grass to be cut when the blade is rotated and another portion inwardly of said end deformed to create an air pressure which will lift the housing and parts assembled thereon to reduce the wheel load and consequently the rolling resistance when said mower is operated.

References Cited
UNITED STATES PATENTS

| | | | |
|---|---|---|---|
| 2,710,069 | 6/1955 | Johnson | 180—19 |
| 2,908,128 | 10/1959 | Mauro | 56—295 |
| 2,924,058 | 2/1960 | Brooks | 56—295 |
| 3,029,887 | 4/1962 | Schantz | 180—19 |
| 1,827,559 | 10/1931 | Beazley | 56—25.4 |
| 2,642,711 | 6/1953 | Smith et al. | 56—2.55 |
| 2,737,003 | 3/1956 | Beers | 56—25.4 X |
| 2,760,327 | 8/1956 | Boree | 56—25.4 |
| 2,936,564 | 5/1960 | Berry | 56—295 |
| 3,110,996 | 11/1963 | Dahlman | 56—25.4 |
| 3,162,990 | 12/1964 | Cook | 56—295 |
| 3,170,276 | 2/1965 | Hall | 56—25.4 |
| 3,183,655 | 5/1965 | Dunlap et al. | 56—295 |
| 3,186,151 | 6/1965 | Hancom | 56—25.4 |
| 3,220,170 | 11/1965 | Smith et al. | 56—255 |
| 3,192,692 | 7/1965 | Slemmons | 56—25.4 |

ABRAHAM G. STONE, *Primary Examiner.*

RUSSELL R. KINSEY, *Assistant Examiner.*